(12) United States Patent
Benmimoun et al.

(10) Patent No.: US 11,904,888 B2
(45) Date of Patent: Feb. 20, 2024

(54) CONTROLLING VEHICLE FUNCTIONS

(71) Applicant: Ford Global Technologies, LLC, Dearborn, MI (US)

(72) Inventors: Ahmed Benmimoun, Aachen/NRW (DE); Mohamed Benmimoun, Aachen/NRW (DE); Sufian Ashraf Mazhari, Aachen/NRW (DE); Mohsen Lakehal-Ayat, Aachen/NRW (DE); Muhammad Adeel Awan, Aachen/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/050,054

(22) Filed: Oct. 27, 2022

(65) Prior Publication Data

US 2023/0150535 A1    May 18, 2023

(30) Foreign Application Priority Data

Nov. 12, 2021   (DE) .......................... 102021129535.1

(51) Int. Cl.
*B60W 60/00* (2020.01)
*B60W 50/06* (2006.01)
*B60W 50/00* (2006.01)

(52) U.S. Cl.
CPC .......... *B60W 60/001* (2020.02); *B60W 50/06* (2013.01); *B60W 2050/0043* (2013.01); *B60W 2555/00* (2020.02)

(58) Field of Classification Search
CPC .............. B60W 60/001; B60W 50/06; B60W 2050/0043; B60W 2555/00
See application file for complete search history.

(56) References Cited

U.S. PATENT DOCUMENTS 8,577,126 B2   11/2013   Jones et al.
9,855,890 B2   1/2018    James et al.
(Continued)

FOREIGN PATENT DOCUMENTS

DE   102014003913 A1   9/2015
DE   102016120507 A1   5/2017
(Continued)

OTHER PUBLICATIONS

Youtube, "Range Rover Sport Remote Control Demonstration", Jun. 16, 2015.
DE Examination Report dated Aug. 2, 2022 (non-English).

*Primary Examiner* — Peter D Nolan
*Assistant Examiner* — Peter Y Ning
(74) *Attorney, Agent, or Firm* — Frank A. MacKenzie; Bejin Bieneman PLC

(57) ABSTRACT

A system for controlling autonomously-controllable vehicle functions of an autonomous vehicle cooperating with partner subjects includes a database device with information on communication signals from partner subjects, action objectives, and scenarios, and has an autonomous vehicle with autonomously controllable vehicle functions communicatively connected to the database device. The autonomous vehicle includes a control device with a programmable unit and a surround sensor device. The control device receives sensor signals acquired by the surround sensor device of a surrounding area of the vehicle and communication signals originating from at least one partner subject. The control device determines a situation context based on the database information, and converts the captured communication signals into control signals for the autonomously controllable vehicle functions based on the situation context.

18 Claims, 5 Drawing Sheets

(56) References Cited

U.S. PATENT DOCUMENTS

| | | | | |
|---|---|---|---|---|
| 10,446,150 | B2* | 10/2019 | Xun | G10L 15/1815 |
| 10,717,412 | B2 | 7/2020 | Abel Rayan et al. | |
| 11,399,216 | B2* | 7/2022 | Park | H04N 21/4826 |
| 11,550,851 | B1* | 1/2023 | Kabzan | G05D 1/0297 |
| 11,568,239 | B2* | 1/2023 | Yi | G10L 15/16 |
| 2008/0253613 | A1* | 10/2008 | Jones | G06V 40/20 |
| | | | | 704/E15.001 |
| 2013/0339027 | A1* | 12/2013 | Dokor | G09G 5/08 |
| | | | | 704/E15.001 |
| 2016/0167648 | A1* | 6/2016 | James | B60Q 1/547 |
| | | | | 701/28 |
| 2018/0190283 | A1* | 7/2018 | Xun | G10L 15/22 |
| 2019/0143936 | A1* | 5/2019 | Abel Rayan | B60R 25/10 |
| | | | | 701/2 |
| 2019/0371002 | A1* | 12/2019 | Hwang | G06T 7/75 |
| 2020/0027452 | A1* | 1/2020 | Rangarajan | G06F 3/167 |
| 2020/0120395 | A1* | 4/2020 | Park | H04N 21/4828 |
| 2021/0334640 | A1* | 10/2021 | Yi | G06F 3/011 |
| 2022/0048533 | A1* | 2/2022 | Ödblom | G06F 11/3668 |
| 2023/0256991 | A1* | 8/2023 | Johnson | B60W 60/001 |
| | | | | 701/26 |

FOREIGN PATENT DOCUMENTS

| | | | | |
|---|---|---|---|---|
| DE | 102017117223 | A1 | | 1/2019 |
| DE | 102018213600 | A1 | | 2/2020 |
| DE | 102019132035 | A1 | | 5/2021 |
| WO | WO-2019095013 | A1 * | 5/2019 | A61B 3/103 |

\* cited by examiner

CONTROLLING VEHICLE FUNCTIONS

CROSS-REFERENCE TO RELATED APPLICATION

This patent application claims priority to German Application No. DE 102021129535.1, filed on Nov. 12, 2021, which is hereby incorporated by reference in its entirety.

The present disclosure relates to a system and to a method for controlling autonomously-controllable vehicle functions of an autonomous vehicle cooperating with partner subjects.

BACKGROUND

In some situations it can be useful to a user of a vehicle, in particular of a utility vehicle, to make use of vehicle functions of the vehicle when performing a activity, including when the user is not situated in the vehicle to do this. This applies in particular when it is an activity which, without automation, requires in addition to the (first) user at least one second user, i.e., an additional person, who remains in or at the vehicle in order to control the vehicle functions in consultation with the first user. In this context, vehicle functions may include, for example, functions for starting, steering, moving, and stopping the vehicle, but is not limited thereto. Vehicle function may also include, for example, any other functions available according to the particular vehicle type. Thus, for instance, there may be available in the case of a mobile crane, for example, control functions of the crane for moving the crane jib or hoist, or in the case of a goods vehicle, the opening and closing of a tailgate or other loading port, or in the case of an agricultural vehicle, depending on the type, for example controlling a sowing or harvesting function, etc.

For performing the particular activity, it may be necessary, for example, to unload and deliver and/or to load something within short distances, or to move or convey items on a building site, or to perform other work processes at changing positions, and in each case to move the vehicle repeatedly or perform processes repeatedly.

In order that, rather than needing a second user to be in or at the vehicle for the purposes of control, the activity can be performed by a single user, or the two (or also more than two) users can jointly carry out also more complex tasks, it can be provided, for example, a remote control apparatus for operation by a user to provide for the vehicle functions. This is disadvantageous, however, in situations wherein the user needs his hands, or possibly also just his entire attention, to perform his part of the activity.

For single, simple, clearly predefined, known tasks, remote control of vehicle functions by explicit voice commands or gestures can be provided, for example. Unlike cooperation between two or more human users, however, said remote control is confined to executing direct instructions that correspond to direct control commands.

Thus, for instance, U.S. Pat. No. 8,577,126 B2 shows that a vehicle can be controlled by gestures and voice commands in order to assist, as an aid in the team of a plurality of people, these people in their activity.

Performing more complex activities or actions, however, usually requires partner-based cooperation between a plurality of people or subjects involved in the activity, i.e., partner subjects, using the supportive vehicle functions of the vehicle (as an object which is operated at least intermittently by at least one of the people as a partner subject).

SUMMARY

An aspect of the present disclosure is to facilitate effective, partner-based cooperation between at least two partner subjects for the purpose of performing a joint activity or action to achieve a joint action objective using vehicle functions of a vehicle that are supportive in performing the activity, which cooperation requires fewer people.

In one or more implementations of the present disclosure, a system for controlling autonomously-controllable vehicle functions of an autonomous vehicle cooperating with partner subjects includes a database device containing database information on communication signals from partner subjects, action objectives, and scenarios, and includes an autonomous vehicle that can be communicatively connected to the database device and has autonomously controllable vehicle functions, a control device having a programmable unit, and a surround sensor device, which control device is configured to capture in sensor signals acquired by the surround sensor device a surrounding area of the vehicle and at least one partner subject and communication signals originating therefrom, and, taking into account the database information, to determine a situation context, and, taking into account the situation context, to convert the captured communication signals into control signals for the autonomously controllable vehicle functions.

In addition to the at least one partner subject, the vehicle is here itself a further partner subject. Partner subjects are in particular people or users of the vehicle, but can also include robots or other intelligent machines. The vehicle is an autonomous vehicle, i.e., it is designed to control autonomously-controllable vehicle functions itself at least intermittently. For example, it may be an at least intermittently self-driving vehicle. Additionally or alternatively, however, other vehicle functions that do not relate to the locomotion of the vehicle can also be autonomously controllable. The autonomous vehicle is designed to cooperate with the at least one partner subject, in particular with the authorized person or user of the vehicle, i.e., to define its own autonomous control in relation to, and depending on, the behavior of the at least one partner subject, in particular the communication signals therefrom, in such a way as to achieve an action objective, i.e., a purpose of the joint action or the activity.

For this purpose, the system of the present disclosure may include, in addition to the autonomous vehicle, a database device, to which the autonomous vehicle can be communicatively connected. This includes the existence of a permanent or intermittent connection for the purpose of data transfer while the stored data is being received from the database device and, if applicable, while new or updated data can be saved there. In an embodiment, the database device is situated on board the vehicle. In particular, in a further embodiment, the database device is arranged remotely from the vehicle and can be communicatively connected to the vehicle via a wireless data connection.

The database device includes a database or a plurality of individual databases, in which is available database information on communication signals from partner subjects, action objectives and scenarios. Communication signals from partner subjects may be, for example, voice commands or gestures, for instance hand gestures or body postures or body movements that have an associated meaning. It is also possible, however, for movement sequences to be provided as communication signals, for example. In addition, the database device comprises already known, previously defined or learnt possible action objectives. These are related to already known, previously defined scenarios, in which a surrounding area is related to a vehicle, partner subjects and, if applicable, objects needed for the activity. A scenario may contain, for example, the surrounding area of a house building site, a crane as the vehicle having autonomously controllable vehicle functions, a user outside the crane, and a load as the object. An action objective might consist in conveying the load safely onto the roof of the house.

The autonomous vehicle is designed to use its control device to determine first a current situation context in which the vehicle finds itself at that moment. Said situation context corresponds to a probable scenario at a certain point in time during the activity, i.e., during the action sequence for achieving the action objective, for instance in the previously described example a situation in which the load to be conveyed onto the roof is suspended from the crane. The situation context is determined by the control device, for example by its suitably programmed programmable unit, on the basis of an evaluation of sensor signals which are acquired by the surround sensor device and capture the surrounding area of the vehicle and at least one partner subject and communication signals originating therefrom, wherein, using the database device, the sensor signals acquired by the surround sensor device are associated with a possible scenario in order to be able to determine thereby a possible situation context. The surround sensor device comprises one or more vehicle sensors, for example a surround camera, an external microphone, Lidar, radar and/or ultrasound sensors and, if applicable, other sensors suitable for the intended purpose of the particular vehicle. In the aforementioned example, "taking into account the situation context, to convert the captured communication signals into control signals for the autonomously controllable vehicle functions" can mean, for example, that a communication signal in the form of a voice command "further" received in a situation context in which the load is already suspended from the crane, is interpreted as to lift the load higher (and, for instance, not to move the vehicle further away). A communication signal with the same meaning may also be a corresponding gesture. Receiving a communication signal can include, for instance, evaluating audio acquisitions and/or detecting in live video acquisitions of the surrounding area the at least one partner subject by means of video analysis techniques and evaluating visual communication signals originating from said partner subject.

The described system for controlling autonomously-controllable vehicle functions of an autonomous vehicle cooperating with partner subjects provides the autonomous vehicle itself as a partner subject, so that activities that require two partner subjects cooperating with one another can be performed efficiently by just one person.

In an implementation, the control device may be configured to update the situation context continuously taking into account captured changes in the surrounding area and/or captured communication signals. This ensures that the situation context that is actually current always forms the basis for how the communication signals are converted into control signals. It is thereby continuously taken into account that the situation in which the at least one partner subject and the vehicle itself, as a further partner subject, find themselves can develop dynamically, for instance the person, i.e. the at least one partner subject, who is attempting to perform the activity in cooperation with the autonomous vehicle, may behave differently also unexpectedly, for example because of unforeseen changes in the surrounding area, than was expected on the basis of the assumed scenario.

In one or more implementations, the control device may be configured to determine an action objective of the at least one partner subject on the basis of the communication signals, the determined situation context and the database information. For this purpose, in the database device are available possible preset or learned action objectives, for instance related to known scenarios, with a probable action objective then being determined from the situation context or its change over time. Said action objective is the resolution of a higher-level task within the scenario. Achieving this action objective requires a plurality of actions, which the partner subjects execute in cooperation with one another. Determining the action objective of the partner subject means understanding the intention of the partner subject based on the situation context. In a preferred embodiment, artificial intelligence methods are used for this purpose, in particular machine learning methods.

In this context, in an implementation, the control device may also be configured to convert the captured communication signals into control signals in such a way that the autonomous vehicle assists in achieving the action objective of the at least one partner subject. Controlled by the control device, the autonomous vehicle, as a cooperating subject, can thereby assist in achieving the action objective without commands having to be issued by a person or a partner subject. The autonomous vehicle can independently define suitable actions and/or, for example, plan its movement path, in order to assist in the best way possible the achieving of the action objective. If an action objective is determined, there may be no need for explicit, direct commands by the partner subject to the autonomous vehicle, because actions of the partner subject can be predicted, and actions by the autonomous vehicle that are suitable for assisting in the joint action objective can be determined by this vehicle itself. Thus, the autonomous vehicle is configured to plan and execute autonomously its own acts or actions for achieving the joint action objective. A collaborative system is hence facilitated which can be used to achieve even action objectives in complex scenarios efficiently and in a cooperative manner.

In an implementation, the communication signals may include indirect communication signals. Indirect communication signals may be, for example, movements, calls, body postures, which have to be interpreted in the situation context in order to derive therefrom action instructions or commands, and ultimately control signals for the vehicle. Thus, indirect communication signals comprise also implicit communication signals. The person or the partner subject thus does not have to focus his concentration on direct commands for controlling the vehicle functions but instead can concentrate on actions required of himself. For example, if the action objective consists in delivering parcels from a storage space of the vehicle to various recipient house doors which a delivery person can reach successively on foot without getting into the delivery vehicle again, even the behavior of the delivery person of proceeding to the next door can be an indirect communication signal that causes the autonomous vehicle to follow the delivery person. The autonomous vehicle thus plans and executes its own actions to achieve the joint action objective. In the example given, it does this by itself determining a suitable movement path.

In another implementation, the control device may be configured to execute at least one machine learning method in order to learn to recognize automatically indirect communication signals taking into account the situation context.

In this context, in a further implementation, the control device may also be configured to execute the at least one machine learning method in order to learn to evaluate automatically indirect communication signals taking into account the situation context. In this process, the indirect communication signals are interpreted in the situation context. This can comprise ascertaining the action objective of the partner subject, and taking it into account in interpreting the communication signals. The learning can be performed here on the basis of information already available in the database device, although can include current situation contexts and direct communication signals available therein.

In yet another implementation, the control device may be configured to evaluate communication signals automatically using a trained neural network taking into account the situation context.

In a further implementation, the database device may be provided via a Cloud-based network service. It is thereby possible, for example, to provide a particularly extensive database containing communication signals from partner subjects, action objectives and scenarios which is not static, nor updated only by scenarios that involved the autonomous vehicle itself, but can be continuously updated by current information from all vehicles that can be connected to the same database device. The access via a Cloud ensures that current database information is available at all times as long as just one wireless connection via an interface of the vehicle is available. The provision over one or more central database units also allows ready access to a large number of databases suitable for different scenarios, for instance suitable gesture databases and models, including when no suitable information is available locally. In an exemplary embodiment, the database device can also be realized in part via a Cloud-based network service, and in part via a database unit on board the autonomous vehicle, so that the system remains operational for instance even when there is no access available to the Cloud.

According another implementation, a method for controlling autonomously-controllable vehicle functions of an autonomous vehicle cooperating with partner subjects may include providing a database device containing database information on communication signals from partner subjects, action objectives and scenarios, and providing an autonomous vehicle that can be communicatively connected to the database device and has autonomously controllable vehicle functions, a control device having a programmable unit, and a surround sensor device; acquiring, by means of the surround sensor device, sensor signals from a surrounding area of the vehicle and from at least one partner subject, and capturing communication signals originating from the at least one partner subject; determining, taking into account the database information, a situation context; and converting, taking into account the determined situation context, the captured communication signals into control signals for the autonomously controllable vehicle functions.

Thus the advantages and special features of the system and method according to the present disclosure for controlling autonomously-controllable vehicle functions of an autonomous vehicle cooperating with partner subjects are evident.

DETAILED DESCRIPTION

It shall be understood that other implementations can be used, and structural or logical modifications can be made without departing from the scope of the present disclosure. It shall be understood that the features of the various example implementations described above and below can be combined unless specifically stated otherwise. Therefore the description shall not be interpreted in any limiting sense, and the scope of protection of the present invention is defined by the accompanying claims.

Figure 1:
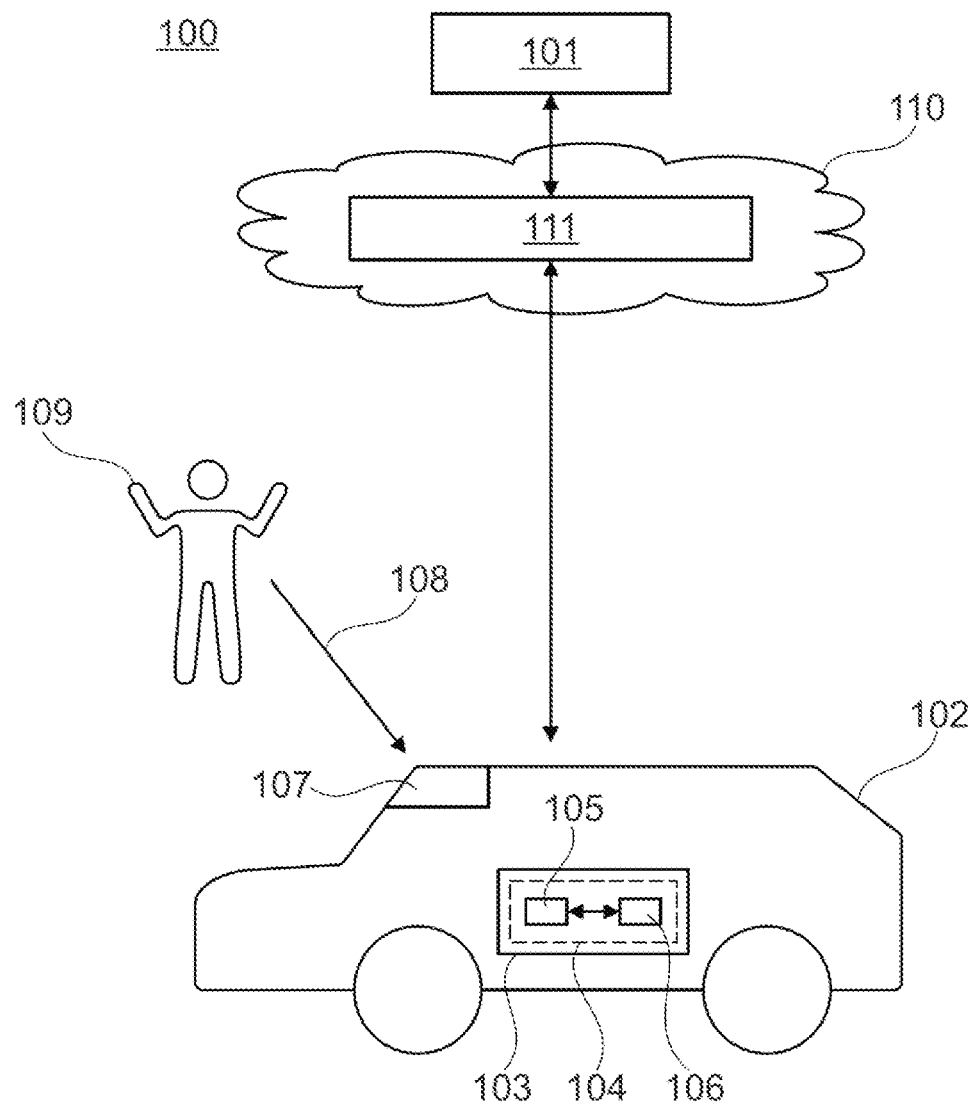
FIG. 1 shows a schematic diagram of an example of a system for controlling autonomously-controllable vehicle functions of an autonomous vehicle cooperating with partner subjects according to an implementation of the present disclosure.

FIG. 1 shows a schematic diagram of an example of a system 100 for controlling autonomously-controllable vehicle functions of an autonomous vehicle cooperating with partner subjects according to an implementation of the present disclosure. The system 100 has a database device 101 containing database information on communication signals from partner subjects, action objectives and scenarios that are associated with a plurality of situation contexts. The database device may be communicatively connected to an autonomous vehicle 102, i.e., to a vehicle having at least one autonomously controllable vehicle function, via a Cloud-based network service 111 in a data network 110, at least part of which is implemented as a wireless network. The autonomous vehicle 102 has a control device 103 for controlling the autonomously controllable vehicle function. The control device 103 has a programmable unit 104 at least having a processor 105 and a memory 106. The control device 103 also has a surround sensor device 107, or is connected thereto, which is used to capture sensor signals 108 from the surrounding area of the vehicle 102. The surround sensor device 107 comprises, for example, at least one image sensor, i.e., a camera, preferably a multi-camera apparatus for an all-around view, and an audio sensor, i.e., a microphone. In the memory 106 of the programmable unit 104 are stored code elements which, when loaded and executed by the processor 105, configure the control device 103 to capture, using sensor signals 108 acquired by the surround sensor device 107, a surrounding area of the vehicle 102, including a partner subject 109, i.e., a person with whom the vehicle 102 is meant to cooperate in the context of the system 100, for example the driver or another authorized person of the vehicle 102, to achieve an action objective intended by the partner subject 109, and to capture communication signals 108 originating from the partner subject 109, for instance direct or indirect visual and/or acoustic communication signals, and, taking into account the database information, to determine a situation context, and, taking into account the situation context, to convert the captured communication signals 108 into control signals for the autonomously controllable vehicle functions.

Figure 2:
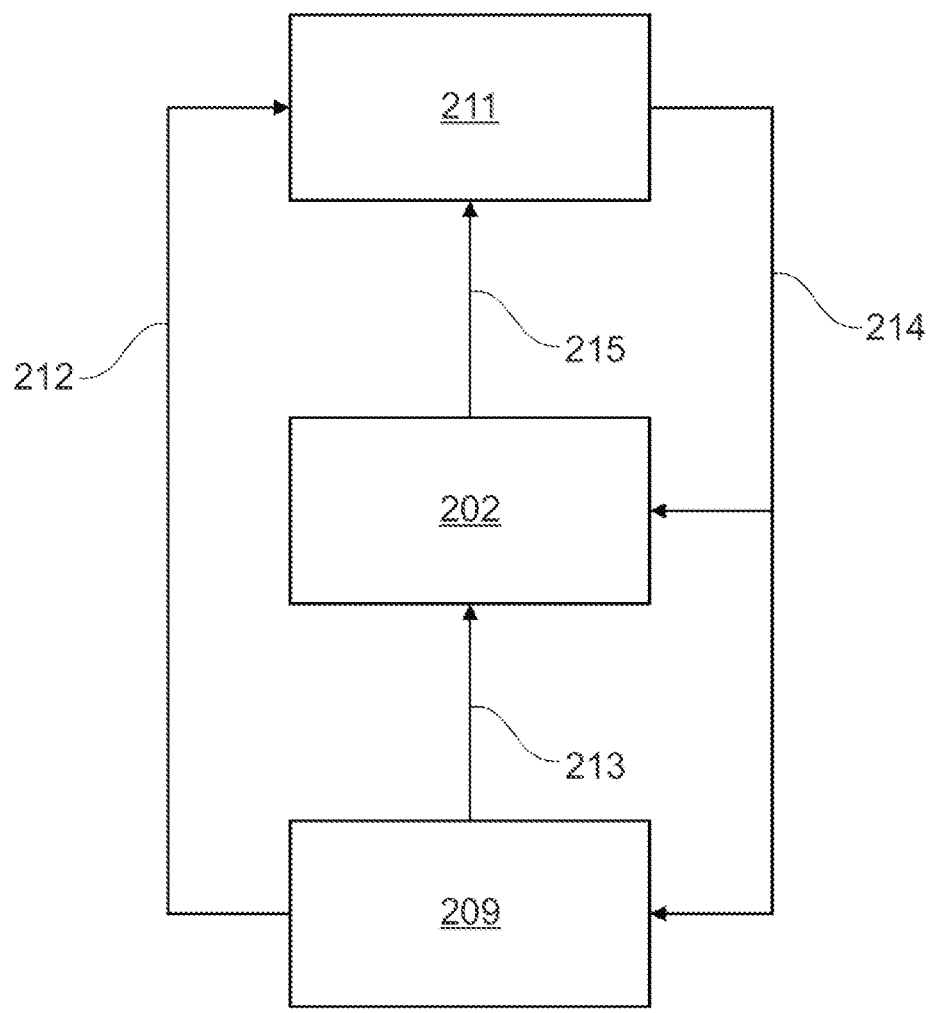
FIG. 2 shows a schematic diagram of interaction of actions of a partner subject and a cooperating autonomous vehicle in a system for controlling autonomously-controllable vehicle functions of an autonomous vehicle cooperating with partner subjects according to an implementation of the present disclosure.

FIG. 2 shows a schematic diagram of interaction of actions of a partner subject 109 and a cooperating autonomous vehicle in a system for controlling autonomously-controllable vehicle functions of an autonomous vehicle cooperating with partner subjects according to an implementation of the present disclosure. The vehicle 202 uses a surround sensor device to capture its surrounding area 211, in which is situated also at least one partner subject 209. By evaluating the surround sensor signals, the status of the surrounding area 211 is evaluated, and the scenario in which the vehicle 202 and the partner subject 209 find themselves is ascertained. The surrounding area 211 is influenced and modified by acts, i.e., actions 212 of the partner subject(s) 209. These new surrounding-area statuses 214 and, if applicable, their effects on the vehicle 202 and the partner subject 209, are in turn captured by the surround sensors of the autonomous vehicle 202. The control device of the vehicle 202 can thereby determine the situation context, i.e. the current status of the scenario, and by means of an extensive database, for example a plurality of different databases designed for different scenarios and action objectives, that is centrally accessible in a Cloud and contains scenarios and possible action objectives and trained artificial intelligence models, for example trained artificial neural networks, can determine the current action objective 213 of the partner subject. In other words, the probable intention of the partner subject is determined in order to derive therefrom, knowing the current situation context, the actions 215 by the autonomous vehicle 202 itself that can assist in achieving the action objective. Also, the actions 215 of the autonomous vehicle 202 then influence again the surrounding area 211 and bring about new surrounding-area statuses 214. In order to determine the actions of the vehicle 202, the control device can comprise an action planning module, which determines a suitable action or sequence of actions, which are meant to be performed in collaboration with the partner subject 209 sequentially or in parallel with the actions thereof.

Figure 3:
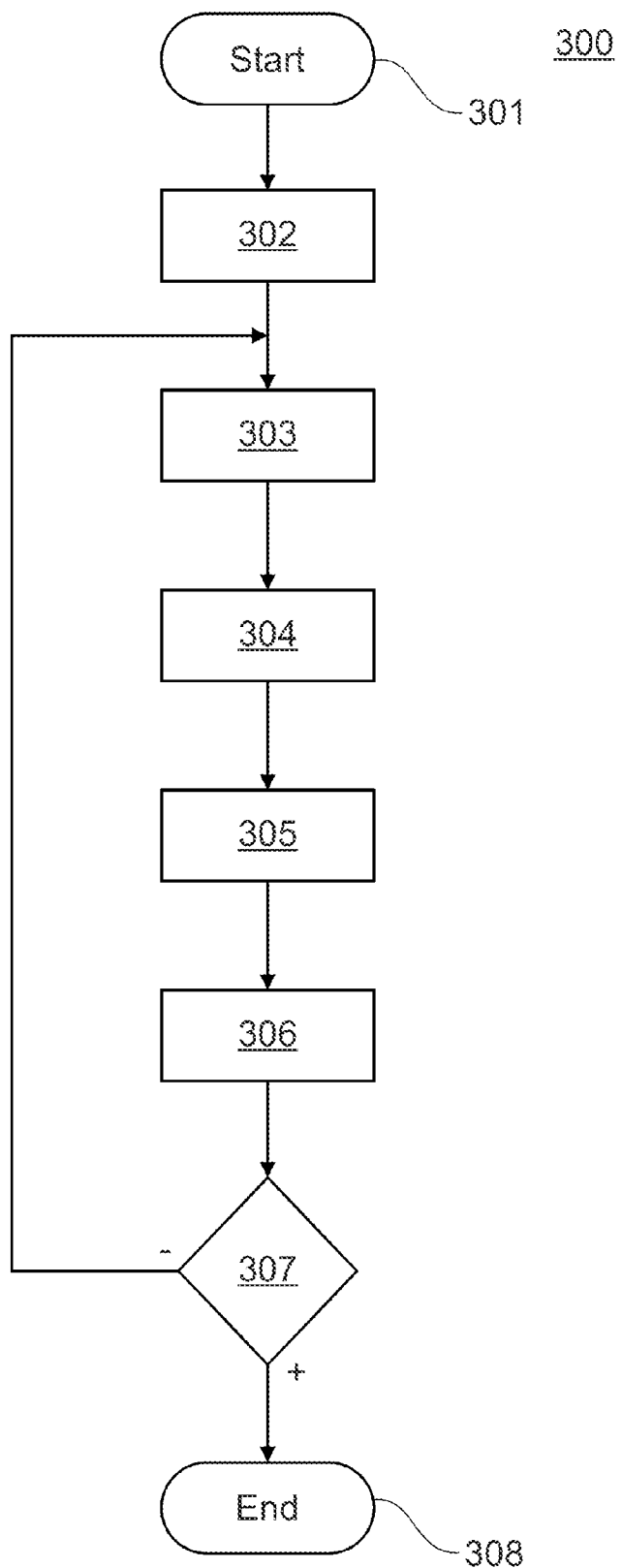
FIG. 3 shows a schematic diagram of an example of a method for controlling autonomously-controllable vehicle functions of an autonomous vehicle cooperating with partner subjects according to a further implementation of the present disclosure.

FIG. 3 shows a schematic diagram of an example of a method for controlling autonomously-controllable vehicle functions of an autonomous vehicle cooperating with partner subjects according to a further implementation of the present disclosure. The method 300 begins in a start state in a first block 301, in which is activated the autonomous control of the autonomously controllable vehicle functions of the vehicle of the system for controlling autonomously-controllable vehicle functions of an autonomous vehicle cooperating with partner subjects, as is shown by way of example in FIG. 1.

A step follows of providing in a next block 302 a database device containing database information on communication signals from partner subjects, action objectives and scenarios, and providing the autonomous vehicle that can be communicatively connected to the database device and has autonomously controllable vehicle functions, a control device having a programmable unit, and a surround sensor device, and acquiring in a block 303, by the surround sensor device, sensor signals from a surrounding area of the vehicle and from at least one partner subject, and capturing in a block 304 communication signals originating from the at least one partner subject, and, taking into account the database information, determining in a block 305 a situation context.

Then in a further step, the captured communication signals are converted in a block 306 into control signals for the autonomously controllable vehicle functions, taking into account the determined situation context.

In a subsequent step, a check in a block 307 is performed as to whether a break condition is satisfied (for instance the action objective is already achieved and/or a direct communication signal to terminate the autonomous operation has been received). If this is not the case (labeled with "−" in FIG. 3), the method proceeds with the further acquisition in block 303 of sensor signals from the surrounding area. If the break condition is satisfied (labeled with "+" in FIG. 3), the method ends in an end state in a block 308, in which the autonomous operation of the vehicle is terminated, or waits in an inactive state for reactivation by a suitable command.

Figure 4:
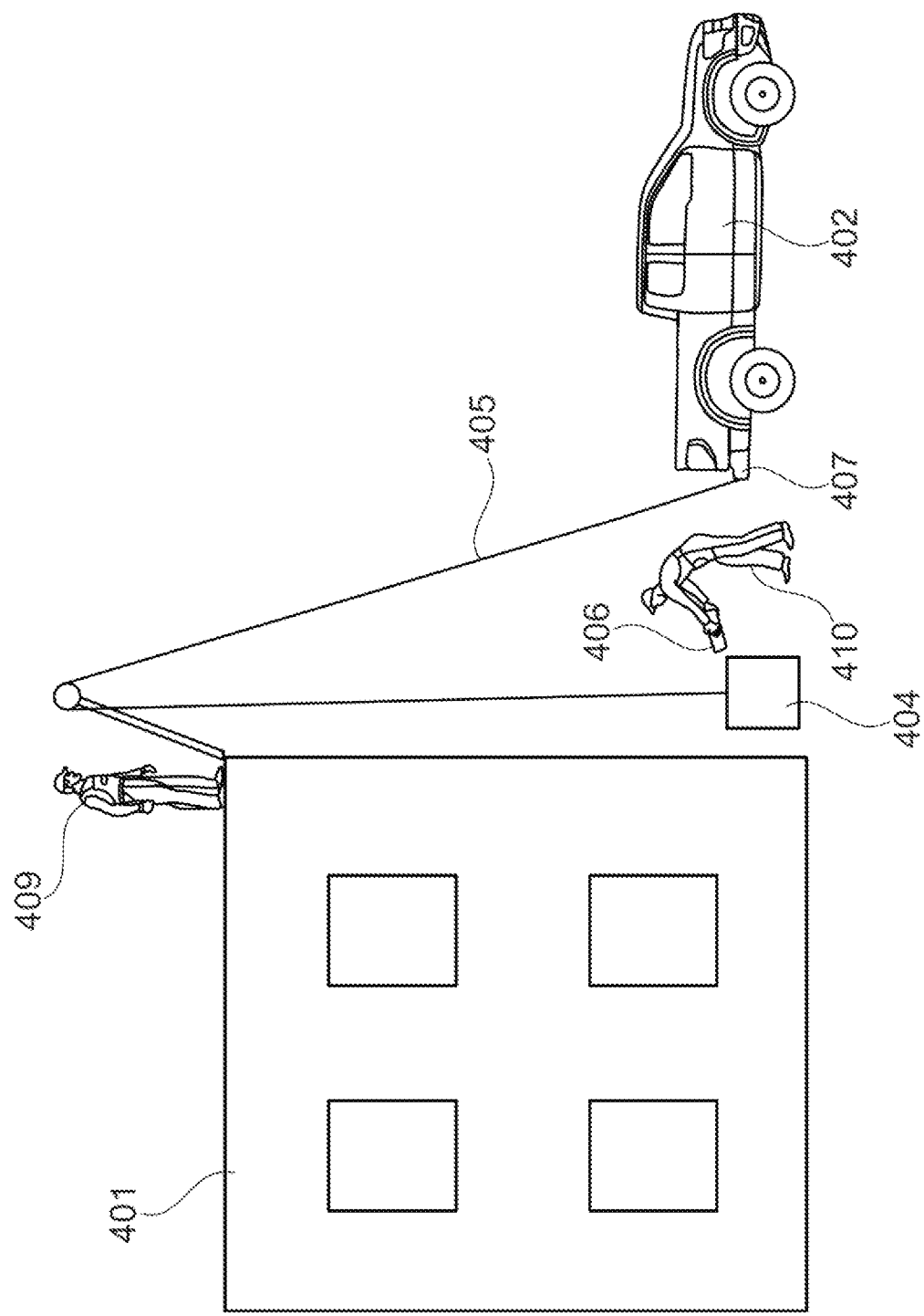
FIG. 4 shows a schematic diagram of an example of a usage case for a system for controlling autonomously-controllable vehicle functions of an autonomous vehicle cooperating with partner subjects.

FIG. 4 shows a schematic diagram of an example of a usage case for a system for controlling autonomously-controllable vehicle functions of an autonomous vehicle cooperating with partner subjects. FIG. 4 shows a building site scenario in which an autonomous vehicle 402 is cooperating with two construction workers or partner subjects, a first partner subject 409 on the roof of a house 401 and a second partner subject 410 on the ground. The joint action objective consists in conveying items, for instance bricks, onto the house roof. In the current situation context, the second partner subject 410 is loading an object 406 into a load container 404 on a cable 405, in order to convey this object onto the house roof. The autonomous vehicle 402 has a cable hoist 407 connected to the cable. In the case of indirect communication, the autonomous vehicle 402 recognizes the loading procedure and assists in achieving the action objective by independently activating the cable hoist 407 after the second partner subject 410 has loaded the load container 404 in order to convey the item 406 by the cable 405 to the first partner subject 409 on the house roof.

On a building site, various action objectives can be assisted by an autonomous vehicle, for instance monitoring duties or distributing items and equipment around the site. Other usage cases, which are not illustrated, for example may relate to running a farm, in which an autonomous vehicle assists the farmer in distributing feedstuff or the like, or to assisting soldiers or other taskforces by transporting items when required, providing environment monitoring information or the vehicle positioning itself as cover if required.

Figure 5:
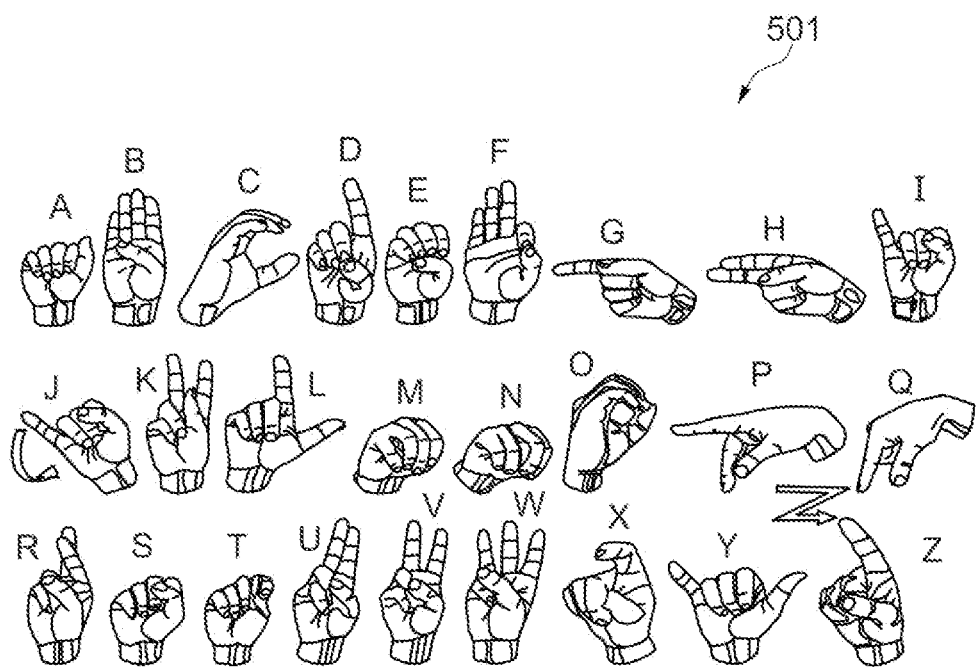
FIG. 5 shows a schematic diagram of examples of direct communication signals from a partner subject.
Figure 5:
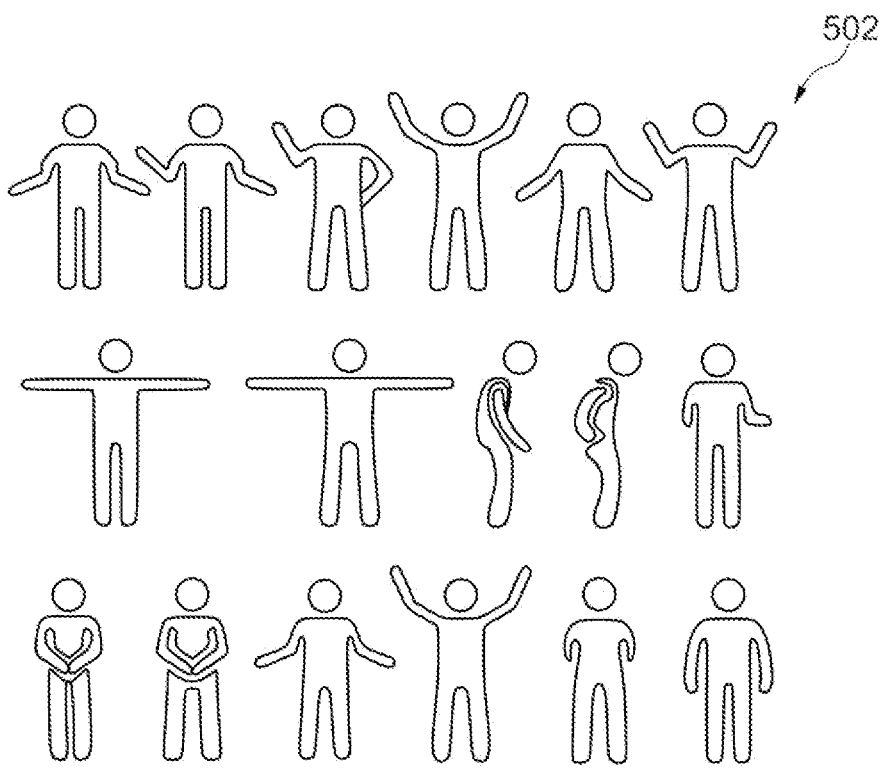

FIG. 5 shows a schematic diagram of examples of direct communication signals from a partner subject. Direct communication signals are used for explicit communication. The autonomous vehicle as a partner subject receives surrounding-area signals, including communication signals from a partner subject, via its surround sensing device. The direct communication signals allow information about the action objective, the next action or an indirect command to be transmitted to the recipient, i.e., the autonomous vehicle. Unless the originator is using technical aids, then, for example, voice signals or other audio signals, gestures, movements etc. are eligible for this purpose as the transmission channels. If the communication signals originate from an intelligent machine, other transmission channels may also be possible, which do not require any voice or image recognition on the part of the recipient.

For gesture recognition in camera images from the surround sensor device, the control device is configured first to detect, and to track over time, a partner subject in the camera image sequences or surround sensor signals. This can be done directly by image analysis techniques. If the partner subject is the driver or another authorized person, for example, in an embodiment it can also be provided first to locate the electronic vehicle key or a mobile phone registered with the autonomous vehicle for the partner subject in order to improve the quality and/or speed of detection of the partner subject.

An example of what can serve as direct communication signals are series of hand gestures 501 that encode the alphabet, so that a very large command vocabulary is possible as long as the control device can access a corresponding dictionary or codebook via the database device. Body postures 502 can also be provided as communication signals, as can combinations of body and hand gestures. Likewise, individual gestures may be associated directly with a command, for instance to move the autonomous vehicle forwards and backwards, to turn the vehicle or to activate a certain vehicle function such as the lighting or a cable hoist or the like. Body movements can also be provided as communication signals. For example, if the partner subject moves in a certain direction, this can mean in a suitable situation context that the vehicle is meant to decide to follow, approach, or make space.

As an alternative or in addition to visual direct communication, it can also be provided, for example, to use voice signals as direct communication signals, provided the surround sensor device of the autonomous vehicle comprises an external microphone, and provided the partner subject has been identified, for example via his electronic vehicle key, his mobile phone or even after suitable training of the system directly by voice recognition. Haptic communication signals can also be provided, as long as the autonomous vehicle has touch sensors on its outside or provides an interface via which a suitable touch-sensitive control unit can be connected.

As an alternative or in addition to the direct communication signals, indirect communication signals can also be used, by means of which the action objective, the next action or a command can be communicated implicitly. Instead of resorting to a known codebook in order to understand the received signals, an interpretation must be made in the particular situation context in order to determine the action objective, for example, on the basis of an extensive database using artificial intelligence methods, in particular suitably trained neural networks, and on the basis of the action objective to predict possible future actions of the partner subject, and to define and execute autonomously suitable own assistive actions.

It shall be understood that in the various embodiments of the method according to the invention, although the method steps are described in a certain order, some of the method steps could be executed in an order other than that described here. It shall also be understood that certain steps can be performed simultaneously or successively, once or multiple times, that other steps could be added or that certain steps described here could be omitted. In other words, the present descriptions are provided for the purpose of illustrating certain embodiments and should not be regarded as limiting the disclosed subject matter. The expression "and/or" used in the description, when used in a series of two or more elements, means that each of the cited elements can be used alone, or any combination of two or more of the cited elements can be used. If, for example, a composition is described as containing the components A, B and/or C, the composition may contain: solely A; solely B; solely C; A and B in combination; A and C in combination; B and C in combination; or A, B and C in combination.

LIST OF REFERENCE SIGNS 100 system for controlling autonomously-controllable vehicle functions of an autonomous vehicle cooperating with partner subjects
101 database device
102 autonomous vehicle
103 control device
104 programmable unit
105 processor
106 memory
107 surround sensor device
108 sensor signal
109 partner subject
110 data network
111 Cloud-based network service
202 autonomous vehicle
209 partner subject
211 surrounding area
212 actions of the partner subject
213 action objective
214 new surrounding-area statuses
215 actions of the autonomous vehicle
300 method for controlling autonomously-controllable vehicle functions of an autonomous vehicle cooperating with partner subjects
301 start
302 providing a database device
303 acquiring sensor signals
304 capturing communication signals
305 determining a situation context
306 converting the captured communication signals into control signals
307 checking whether a break condition is satisfied
308 end
401 house
402 autonomous vehicle
404 load container
405 cable
406 item
407 cable hoist
409 first partner subject
410 second partner subject
501 hand gestures
502 body postures

The invention claimed is:

1. A system for controlling autonomously-controllable vehicle functions, comprising:
a database device containing database information on communication signals from partner subjects, action objectives, and scenarios that are associated with a plurality of situation contexts, wherein the situation contexts correspond to a surrounding area related to a vehicle and at least one partner subject; and
an autonomous vehicle communicatively connected to the database device and including autonomously controllable vehicle functions, a control device, and a surround sensor device,
wherein the control device includes a processor and a memory, the memory storing instructions executable by the processor such that the control device is programmed to:
receive sensor signals acquired by the surround sensor device of the surrounding area of the vehicle and at least one partner subject and communication signals originating therefrom;
determine a situation context by evaluating the received sensor signals of the surrounding area of the vehicle and the at least one partner subject and the communication signals originating therefrom to associate the received sensor signals with a scenario corresponding to the situation context based upon the database information; and
convert the captured communication signals into control signals based upon the situation context for the autonomously controllable vehicle functions.

2. The system according to claim 1, wherein the control device further includes instructions to update the situation context continuously based upon received sensor signals of changes in the surrounding area and/or captured communication signals.

3. The system according to claim 1, wherein the control device further includes instructions to determine an action objective of the at least one partner subject based upon the communication signals in conjunction with the determined situation context and the database information.

4. The system according to claim 3, wherein the control device further includes instructions to convert the captured communication signals into control signals in such a way that the autonomous vehicle assists in achieving the action objective of the at least one partner subject.

5. The system according to claim 4, wherein the communication signals comprise indirect communication signals.

6. The system according to claim 5, wherein the control device further includes instructions to execute at least one machine learning method in order to learn to recognize indirect communication signals based upon the situation context.

7. The system according to claim 6, wherein the control device further includes instructions to execute the at least one machine learning method in order to learn to evaluate indirect communication signals based upon the situation context.

8. The system according to claim 7, wherein the control device further includes instructions to evaluate communication signals using a trained neural network based upon the situation context.

9. The system according to claim 8, wherein the database device is provided via a Cloud-based network service.

10. A method for controlling autonomously-controllable vehicle functions, comprising:
    providing a database device containing database information on communication signals from partner subjects, action objectives and scenarios that are associated with a plurality of situation contexts, wherein the situation contexts correspond to a surrounding area related to a vehicle and at least one partner subject;
    providing an autonomous vehicle that can be communicatively connected to the database device and has autonomously controllable vehicle functions, a control device having a programmable unit, and a surround sensor device;
    acquiring, by the surround sensor device, sensor signals from the surrounding area of the vehicle and from the at least one partner subject, and capturing communication signals originating from the at least one partner subject;
    determining a situation context by evaluating the received sensor signals of the surrounding area of the vehicle and the at least one partner subject and the communication signals originating therefrom to associate the received sensor signals with a scenario corresponding to the situation context based upon the database information; and
    converting, taking into account the determined situation context, the captured communication signals into control signals for the autonomously controllable vehicle functions.

11. The method according to claim 10, further comprising updating the situation context continuously based upon received sensor signals of changes in the surrounding area and/or captured communication signals.

12. The method according to claim 10, further comprising determining an action objective of the at least one partner subject based upon the communication signals in conjunction with the determined situation context and the database information.

13. The method according to claim 12, further comprising converting the captured communication signals into control signals in such a way that the autonomous vehicle assists in achieving the action objective of the at least one partner subject.

14. The method according to claim 13, wherein the communication signals comprise indirect communication signals.

15. The method according to claim 14, further comprising executing at least one machine learning program in order to learn to recognize indirect communication signals based upon the situation context.

16. The method according to claim 15, further comprising executing the at least one machine learning program in order to learn to evaluate indirect communication signals based upon the situation context.

17. The method according to claim 16, further comprising executing communication signals using a trained neural network based upon the situation context.

18. The method according to claim 17, wherein the database is provided via a Cloud-based network service.

* * * * *